(12) United States Patent
Wen et al.

(10) Patent No.: US 8,080,089 B1
(45) Date of Patent: Dec. 20, 2011

(54) METHOD AND APPARATUS FOR EFFICIENT GAS TREATING SYSTEM

(75) Inventors: Harvey W. Wen, Boyds, MD (US); Charles L. Kimtantas, Sugar Land, TX (US)

(73) Assignee: Bechtel Power Corporation, Frederick, MD (US)

( * ) Notice: Subject to any disclaimer, the term of this patent is extended or adjusted under 35 U.S.C. 154(b) by 310 days.

(21) Appl. No.: 12/423,319

(22) Filed: Apr. 14, 2009

Related U.S. Application Data

(60) Provisional application No. 61/124,051, filed on Apr. 14, 2008.

(51) Int. Cl.
*B01D 53/14* (2006.01)
*B01D 53/62* (2006.01)

(52) U.S. Cl. ............... 95/166; 95/168; 95/174; 95/236; 423/228

(58) Field of Classification Search .................. 95/159, 95/165, 166, 168, 169, 172–174, 210, 211, 95/236; 423/220, 226, 228, 229
See application file for complete search history.

(56) References Cited

U.S. PATENT DOCUMENTS

| | | | | |
|---|---|---|---|---|
| 3,962,404 A * | 6/1976 | Giammarco et al. | ......... | 423/222 |
| 4,113,837 A * | 9/1978 | Kendall et al. | ................ | 423/226 |
| 4,152,217 A * | 5/1979 | Eisenberg et al. | ................ | 203/2 |
| 4,242,108 A * | 12/1980 | Nicholas et al. | ................ | 95/166 |
| 4,528,002 A * | 7/1985 | Linde | .............. | 95/174 |
| 4,749,555 A * | 6/1988 | Bush | .............. | 423/228 |
| 6,139,605 A * | 10/2000 | Carnell et al. | ................. | 95/164 |
| 7,377,967 B2 * | 5/2008 | Reddy et al. | .................... | 96/242 |
| 7,635,408 B2 * | 12/2009 | Mak et al. | ........................ | 95/187 |

* cited by examiner

*Primary Examiner* — Frank Lawrence, Jr.
(74) *Attorney, Agent, or Firm* — Duane Morris LLP

(57) ABSTRACT

A method of treating gas, such as flue gas, is provided. Flue gas is received into a vessel. The flue gas in the vessel is cooled by at least 17 degrees F. to a temperature of 120 F or lower. Also in the vessel, $SO_x$ compounds are removed such that the concentration of $SO_x$ remaining in the flue gas is between 0 ppmv and 10 ppmv. After the flue gas is cooler and $SO_x$ compounds are removed in the vessel, the flue gas is transmitted to a flue gas carbon dioxide scrubbing unit.

5 Claims, 2 Drawing Sheets

Process Flow Diagram

Figure 1 Process Flow Diagram

METHOD AND APPARATUS FOR EFFICIENT GAS TREATING SYSTEM

CROSS-REFERENCES TO RELATED APPLICATIONS

This application claims the benefit of U.S. Provisional Application Ser. No. 61/124,051, which was filed on Apr. 14, 2008, which is incorporated by reference.

FIELD OF THE INVENTION

The field of the invention is flue gas treatment systems, including carbon dioxide capture, for use in power plants.

BACKGROUND OF THE INVENTION

Carbon dioxide ($CO_2$) is the primary product of fuel combustion. It has been identified as a greenhouse gas that should be reduced in order to mitigate climate change. Since the early 1980s, many flue gas scrubbing units using monoethanolamine (MEA) have been installed and operated in industrial plants to capture $CO_2$ for use in chemical processing and for beverage manufacturing.

Energy consumption is currently high for MEA based $CO_2$ capture plants. It is desirable to reduce energy consumption as well as integrate the $CO_2$ capture plant with the host power plant for better overall heat utilization. Through computer simulation, a number of integration benefits have been identified and they have been incorporated in this patent application.

BRIEF SUMMARY OF THE INVENTION

A method of treating gas, such as flue gas, is provided. Flue gas is received into a vessel. The flue gas in the vessel is cooled by at least 17 degrees F. to a temperature of 120 F or lower. Also in the vessel, $SO_x$ compounds are removed such that the concentration of $SO_x$ remaining in the flue gas is between 0 ppmv and 10 ppmv. After the flue gas is cooler and $SO_x$ compounds are removed in the vessel, the flue gas is transmitted to a flue gas carbon dioxide scrubbing unit.

DETAILED DESCRIPTION OF THE INVENTION

Figure 1:
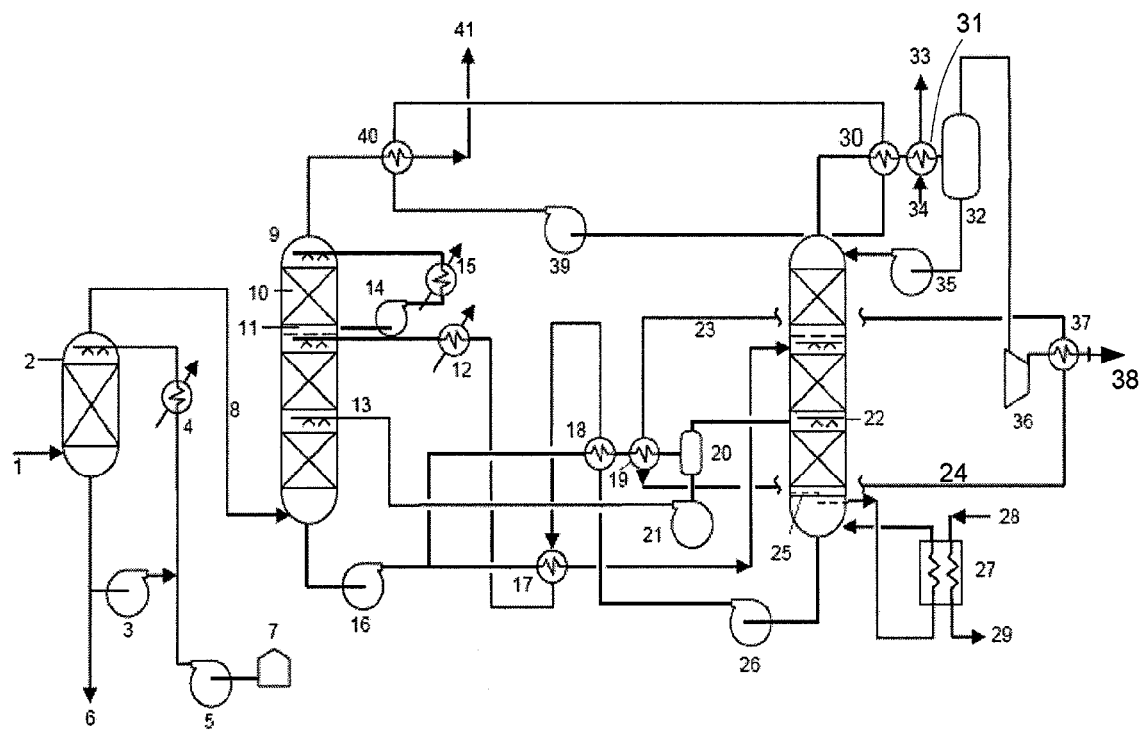
FIG. 1 shows a process flow for capturing carbon dioxide.

A method and apparatus are provided to reduce the energy requirements of a gas treating system and a method of thermal integration between a flue gas carbon dioxide capture plant and a thermal power plant. The primary application of this process is for use in a power plant flue gas $CO_2$ recovery system, but it can also be used in hydrocarbon gas treating systems. In a coal fired power plant, the flue gas produced is generally treated with a desulfurization process that removes 97-98% of sulfur before release. The 2-3% of sulfur that is not removed can degrade the solvent utilized in the downstream $CO_2$ capture plant. A method is provided to combine deep sulfur removal and flue gas cooling, as well as a method to recover waste heat for use in solvent regeneration. The $CO_2$ depleted flue gas is reheated with waste heat before venting to the atmosphere.

Existing plants show high solvent degradation rates in the presence of sulfur dioxide. In an amine absorber, amine will react with sulfur compounds present in the flue gas to form a heat stable salt, mostly in the form of ammonium sulfate or bisulfate. These reactions will degrade the amine and increase both amine reclaimer sludge generation and amine makeup requirement. The amine sludge is considered a hazardous waste and needs to be disposed of offsite. The removal of any residual $SO_x$ before sending the flue gas to the amine scrubber is therefore preferred for economical operation of an amine plant. A conventional wet flue gas desulfurization process can remove sulfur dioxide up to 97-98% and cool the flue gas to about 137° F. However, the amine scrubber requires the entering gas to be 120° F. or lower in order to achieve optimal performance. In addition, experience has indicated that the $SO_2$ entering the amine absorber should be limited to less than 10 ppmv (parts per million by volume). A combined deep sulfur removal and cooling process is an attractive option to meet these requirements while minimizing additional equipment requirements. Generally, the $SO_x$ concentration is about the same as the $SO_2$ concentration, although there may be a small amount of $SO_3$ present.

In present practice, flue gas from a fossil plant is treated for desulfurization before release. Using some conventional methods, the desulfurized flue gas has an $SO_x$ content of 10-60 ppmv, or more, and a temperature of about 137 F.

A method of treating gas, such as flue gas for carbon capture, is provided. Flue gas is received into a vessel. The flue gas in the vessel is cooled by at least 17 degrees F. to a temperature of 120 F or lower. Also in the vessel, $SO_x$ compounds are removed such that the concentration of $SO_x$ remaining in the flue gas is between 0 ppmv and 10 ppmv. After the flue gas is cooled and $SO_x$ compounds are removed in the vessel, the flue gas is transmitted to a flue gas carbon dioxide scrubbing unit. Preferably, the flue gas carbon dioxide scrubbing unit removes up to 95% of the $CO_2$ present.

Preferably, a reagent used to remove $SO_x$ compounds in the vessel is routed to a spent amine reclaimer, where amine is reclaimed.

Preferably, $SO_x$ compounds are removed in the vessel such that the concentration of $SO_2$ is less than 10 ppmv.

Preferably, the flue gas as received in the vessel has a temperature of 137 F or lower, and an $SO_2$ content of 10-60 ppm. These ranges are the norm for conventional wet flue gas desulfurization processes. Preferably, a conventional wet flue gas desulfurization process is used to treat the flue gas prior to being received in the vessel.

Preferably, the flue gas is cooled to a temperature of 120 F or lower and $SO_x$ compounds are removed in the vessel by a scrubber having water that contains a low concentration of alkali based sulfur scrubbing reagent. Preferred alkali based sulfur scrubbing reagents include soda ash, caustic and aqueous ammonia.

Sodium based spent reagents used in the vessel may still contain unused sodium compounds. Preferably, such spent reagents are routed to an amine reclaimer as a feedstock for the reclaimer. This sequential use of sodium reduces the overall sodium compound consumption in the carbon capture process.

A device is provided. The device includes a scrubber. The scrubber further includes an inlet for flue gas, an outlet for the flue gas, an inlet for water that contains a low concentration of alkali based sulfur scrubbing reagent, and an outlet for water that contains a low concentration of alkali based sulfur scrubbing reagent. A water return pump is in fluid communication with the outlet port for water and the inlet port for water. A blow down stream is disposed between the outlet port for water and the water return pump. A reagent makeup pump is adapted to add alkali based sulfur scrubbing reagent to water between the water return pump and the inlet for water. A cooler is disposed between and in fluid communication with the water return pump and the inlet port for water.

A method is provided. $CO_2$ is removed from flue gas in a $CO_2$ absorber column using an amine based solvent, resulting in a $CO_2$ rich solvent and a $CO_2$ lean flue gas. The $CO_2$ rich solvent is regenerated for reuse in the $CO_2$ absorber column by a combination of a primary process stream and a secondary process stream, wherein 60-90% by volume of the $CO_2$ rich solvent is regenerated by the primary process stream, and 10-40% by volume of the $CO_2$ rich solvent is regenerated by the secondary process stream. The primary process stream further comprises: stripping the $CO_2$ rich solvent by passing it through a stripper comprising stripper beds, resulting in $CO_2$ lean solvent, and stripper overhead gas that contains steam and stripped $CO_2$. The secondary process stream further comprises: heating the $CO_2$ rich solvent using heat recovered from the $CO_2$ lean solvent and heat recovered from compressing $CO_2$, then flashing the $CO_2$ rich solvent in a flash drum, resulting in $CO_2$ rich vapor and $CO_2$ semi-lean solvent. After the solvent is regenerated, the $CO_2$ lean and semi-lean solvent may be reused in the $CO_2$ absorber column. The compressed $CO_2$ stream may be cooled, and recovering heat from this cooling may be used for heating the secondary process stream. Heat may be recovered from the stripper overhead gas for use in stack gas reheating.

Preferably, heat resulting from compressing $CO_2$ is used to heat the $CO_2$ rich solvent in the secondary process stream.

Preferably the first process stream further comprises heating the $CO_2$ lean solvent in a plate heat exchanger prior to reuse in the $CO_2$ absorber column. Preferably, the amine enters the plate heat exchangers at the bottom of the heat exchangers and exits at the top of heat exchangers. A preferred configuration for generating the driving force for the amine liquid circulation is by thermal siphon. Another preferred configuration is to add circulating pumps to pump the liquid through the plate heat exchangers.

Preferably the compressed $CO_2$ gas is cooled by a steam generating heat exchanger to generate a saturated steam for use in heating the secondary process stream.

Preferably, waste heat is recovered from a stripper overhead condenser for reheating the stack gas. The preferred configuration is put a heating coil inside the absorber column 9 and above the water wash section 10. An alternate configuration is to locate the heating coil near the stack.

FIG. 1 depicts the process flow diagram as applied to capturing carbon dioxide from post-combustion flue gas. The source of flue gas can be from the combustion of gas, oil or solid fuels such as coal or biomass.

FIG. 1 is the flue gas that has been treated to meet current emission standards for sulfur oxides, nitrogen oxides, particulates and other regulated emissions. In the case of sulfur oxides, the current best available control technology can achieve about 97-98% sulfur removal. The remaining 2-3% is an allowable emission rate to the atmosphere. However, this residual sulfur can cause the $CO_2$ capture solvent to degrade. Deep sulfur removal is therefore needed to reduce the sulfur content to less than 10 parts per million (ppmv). Stream 1 enters the scrubber/cooler 2 where flue gas is cooled to 120° F. or lower as well as going through a deep desulfurization in a packed bed at the same time. The scrubbing water return pump 3 re-circulates the scrubber water back to the top of scrubber via a cooler 4. The scrubber water contains a low concentration of alkali based sulfur scrubbing reagent such as soda ash, caustic, or aqueous ammonia. A blow down stream 6 controls the concentration of reagent in the scrubber/cooler by controlled bleeding. A constant supply of premixed reagent is stored in tank 7. Reagent makeup pump 5 is used to supply the premixed reagent to the scrubbing water system.

The de-sulfurized and cooled flue gas 8 is fed to the $CO_2$ absorber column 9. The absorber is comprised of several sections of packed beds 10. Either random packing rings or structural packing materials can be used in these beds. In the column 9, flue gas rises up and its $CO_2$ content is absorbed by the falling solvent. Monoethanolamine (MEA) is normally used as a primary solvent for this purpose, but other amines or ammonia based solvents can also be used in this system. The $CO_2$ rich solvent from the bottom of the column is pumped by pump 16 and recycled back to the stripper 22 for regeneration. After passing the absorber beds, the flue gas is washed in packed beds 10, preferably water wash beds, to remove any entrained or vaporized solvent. The wash water is supplied by the wash water pump 14 via cooler 15. The wash water is recovered by a chimney tray 11 and returned for circulation by the pump 14.

To regenerate the $CO_2$ rich spent solvent, a "slip stream" design is employed in this system. From the rich amine pump 16, the rich solvent is split into two streams. About 60-90% of pump 16 discharge is routed to the second lean/rich heat exchanger 17. After heating in 17, the rich amine is routed to the stripper 22. The stripper 22 is comprised of a number of packed beds. The top bed is for reflux and the lower beds are for $CO_2$ stripping. The heated rich amine is routed to a spray distributors located at the top of stripping beds and below the reflux bed. About 10-40% of pump 16 discharge is routed to the first lean/semi-rich heat exchanger 18 where the rich solvent is heated. This small stream of rich solvent is further heated by a steam heater 19 before entering a flash drum 20. The flashed vapor is routed to the stripper 22, preferably a packed column, via a predetermined entry nozzle. The flash drum 20 bottom solvent is a semi-lean solvent, and it is pumped back as stream 13 to the middle of absorber column via pump 21. The steam supply 23 to the steam heater 19 is recovered from the $CO_2$ compressor intercooler 37. The steam condensate 24 from steam heater 19 is returned to the compressor intercooler 37 for making steam for recycle back to the steam heater 19.

The stripped solvent in the stripper 22 is collected on a chimney tray 25 and drained to a heat exchanger 27, preferably a reboiler, for heating. The heat exchanger 27 can be a kettle type reboiler or a plate heat exchanger. The use of plate heat exchanger in this service has an advantage of lowering the capital cost over a conventional shell and tube kettle type reboiler. A low pressure steam 28 is supplied to the reboiler and the steam condensate 29 is returned. The stripped (lean) solvent is returned to absorber 9 by pump 26 through heat exchangers 18 and 17, where heat may be extracted from the stripped solvent to heat rich or semi-rich solvent, and through cooler 12.

The top of stripper column is equipped a packed bed to be used as a reflux bed. The stripper overhead vapor contains steam and stripped $CO_2$. The heat in the stripper overhead vapor is used to heat the absorber effluent flue gas via a pump around circuit using a non-freezing glycol fluid. A reflux cooler 30 is used to heat glycol fluid that supplies heat to a vent gas heater 40 located in the flue gas vent duct before venting to the atmosphere 41. The vent gas heater 40 is a fin-coil type heater. A pump 39 is used to circulate the glycol fluid between the reflux cooler 30 and the vent gas heater 40. Without vent gas heating, the venting gas may be too cold and may cause plume dispersing problem.

The reflux vapor downstream of the reflux cooler 30 is further cooled in another reflux trim cooler 31. The cooling fluid 34 for this trim cooler can be cooling tower water or can be other cooling water sources. If there is a steam power plant nearby, the condensate from its steam turbine condenser can be used here to recover this waste heat. The warm cooling fluid 33 is returned to the cooling source for recycle. The effluent form the reflux cooler 31 enters the reflux drum 32 where condensed water is returned to the stripper via the reflux pump 35, and the vapor rich in $CO_2$ is routed to a compressor 36 where it is compressed. The compressor 36 discharge gas has a temperature of over 300° F. and this heat is recovered in a compressor intercooler 37, which also acts as a steam generator, to make steam for use in the steam heater 19. The compressed $CO_2$ is further cooled and may be liquefied for transport 38. The recovered $CO_2$ can be used for enhanced oil recovery or can be sequestered underground.

Figure 2:
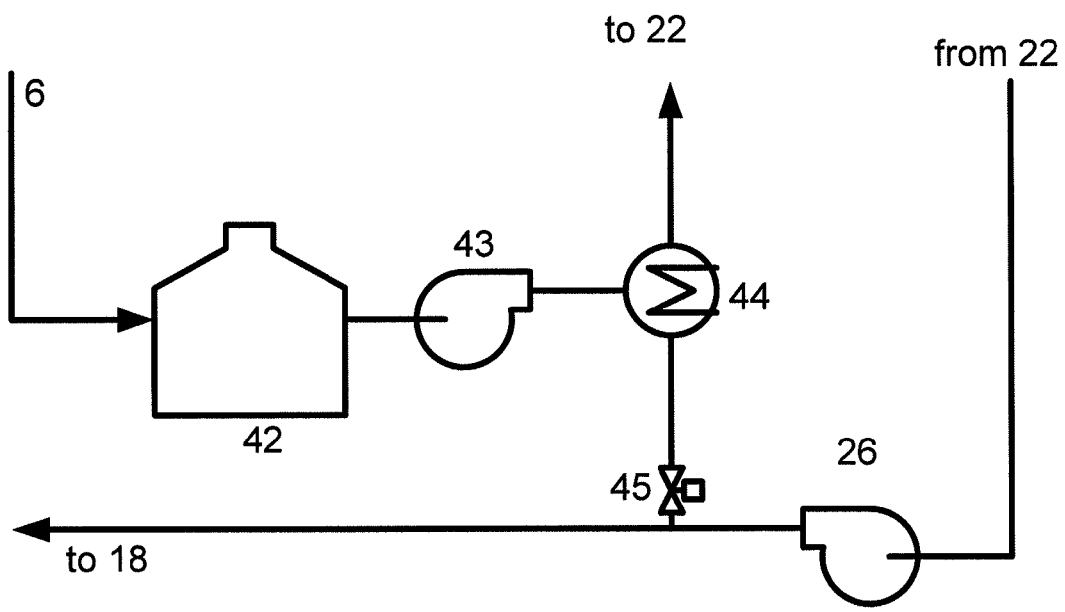
FIG. 2 shows a process flow for an amine reclaimer that uses sodium compounds from a blowdown stream.

Blowdown stream 6 from absorber column 9 may contain unreacted sodium compounds. As shown in FIG. 2, the blowdown may be collected in a storage tank 42. A reclaimer pump 43 may be used to transport the sodium-bearing liquid from tank 42 and inject it into an amine reclaimer 44. Amine reclaimer 44 may be used to reprocess a small stream of lean amine pumped by pump 26 from stripper column 22 to remove impurities. The amount and timing of lean amine reprocessed by amine reclaimer 44 may be controlled by any suitable device, such as a valve 45. Reprocessed lean amine may be returned to stripper column 22. Amine reprocessing is preferably used only intermittently, such as when the impurity level rises to an undesirable amount. The amount of amine diverted to reclaimer 44 from the stream moving from pump 26 to heat exchanger 18 is preferably a small fraction, generally less than 5%. Conventional amine reclaimers use fresh sodium compounds as a feed. As illustrated in FIG. 2, system economics may be improved by using spent material from blowdown stream 6 instead.

Table 1 shows the effect of using deep sulfur removal on amine makeup rate. The 4-8 lbs/ton of $CO_2$ captured rate is based on industrial experience from existing plants.

TABLE 1

Effect of deep sulfur removal on amine makeup rate

|  | Without deep sulfur removal | With deep sulfur removal to 1 ppmv $SO_x$ |
|---|---|---|
| $SO_x$ entering amine absorber | 50 mmmv | 1 ppmv |
| Amine makeup rate due to sulfur degradation | 4-8 pounds per ton of $CO_2$ captured | 2 pounds per ton of $CO_2$ captured | ppmv—parts per million by volume

Table 2 shows the effect on stripper steam consumption using Slip Flow and Heat Recovery configuration

TABLE 2

Effect on stripper steam consumption

|  | Without slip stream | With slip stream flow |
|---|---|---|
| Amine used | 30% monoethanolamine (MEA) | 30% monoethanolamine (MEA) |
| LP (45 psia) saturated steam consumption rate (lb of steam per lb of $CO_2$ capture) | 1.7-1.8 | 1.4-1.5 |

A process for efficient gas treating system for recovery of $CO_2$ from flue gas and integration between the gas treating system and thermal power plant is provided. The process disclosed has several advantages, which separately or preferably in combination, provide for a more efficient and/or more advantageous method of treating gas and removing $CO_2$.

(1) The use of a single vessel, scrubber/cooler 2, to achieve deep sulfur removal and flue gas cooling provides efficiency and reduces the complexity of the overall apparatus.

(2) Heat recovery from $CO_2$ compressor intercooler 37, which may include a compressor discharge intercooler and/or aftercooler, to make steam to heat a slip stream of rich solvent prior to flashing it in a flashed drum 20 allows for the creation a semi-lean solvent that can be used in the absorber without the need to use imported steam for regeneration.

(3) The use of plate type heat exchanger in solvent regeneration service. A plate type heat exchanger is a known device for heat transfer, but its use to replace kettle type reboiler is new.

(4) A slip stream of $CO_2$ rich solvent is used to by-pass 10-40% of flow to a flash drum 20 after heating by the heat exchanger 18 and the steam heater 19. This slip stream advantageously reduces the duty of the heat exchanger 27.

(5) The use of waste heat in the reflux cooler 30 to heat the effluent vent gas from absorber 9. Without this heating, the vent gas temperature may be in the range of 100-140° F. which is too cold for release to the atmosphere without creating dispersion problem. Heating of the vent gas can add buoyancy to the vent gas and eliminates the white plume associated with the vent.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore includes variations from the particular examples and preferred embodiments described herein, as will be apparent to one of skill in the art. It is understood that various theories as to why the invention works are not intended to be limiting.

The invention claimed is:

1. A method, comprising:
    removing $CO_2$ from flue gas in a $CO_2$ absorber column using an amine based solvent, resulting in a $CO_2$ rich solvent and a $CO_2$ lean flue gas;
    regenerating the $CO_2$ rich solvent for reuse in the $CO_2$ absorber column by a combination of a primary process stream and a secondary process stream, wherein 60-90% by volume of the $CO_2$ rich solvent is regenerated by the primary process stream, and 10-40% by volume of the $CO_2$ rich solvent is regenerated by the secondary process stream;
    wherein the primary process stream further comprises:
        stripping the $CO_2$ rich solvent by passing it through a stripper comprising stripper beds, resulting in $CO_2$ lean solvent, and stripper overhead gas that contains steam and stripped $CO_2$;
    wherein the secondary process stream further comprises:
        heating the $CO_2$ rich solvent using heat recovered from the $CO_2$ lean solvent and heat recovered from compressing $CO_2$;
    flashing the $CO_2$ rich solvent in a flash drum, resulting in $CO_2$ rich vapor and $CO_2$ semi-lean solvent;
    reusing the $CO_2$ lean and semi-lean solvent in the $CO_2$ absorber column;
    cooling the compressed $CO_2$ stream and recovering heat for heating the secondary process stream; and recovering heat from the stripper overhead gas for use in stack gas reheating.

2. The method of claim 1, wherein the heat resulting from compressing $CO_2$ is used to heat the $CO_2$ rich solvent in the secondary process stream.

3. The method of claim 1, wherein the first process stream further comprises: heating the $CO_2$ lean solvent in a plate heat exchanger prior to reuse in the $CO_2$ absorber column.

4. The method of claim 2, wherein the compressed $CO_2$ gas is cooled by a steam generating heat exchanger to generate a saturated steam for use in heating the secondary process stream.

5. The method of claim 2, wherein a reclaimer pump is used to transport unreacted sodium compounds to an amine reclaimer.

* * * * *

UNITED STATES PATENT AND TRADEMARK OFFICE
CERTIFICATE OF CORRECTION

| | | |
|---|---|---|
| PATENT NO. | : 8,080,089 B1 | |
| APPLICATION NO. | : 12/423319 | |
| DATED | : December 20, 2011 | |
| INVENTOR(S) | : Wen et al. | |

It is certified that error appears in the above-identified patent and that said Letters Patent is hereby corrected as shown below:

On the Title Page

Item (75), the full name of the first inventor should be corrected to read:

Harvey Wen

Signed and Sealed this
Tenth Day of July, 2012

David J. Kappos
*Director of the United States Patent and Trademark Office*